US011593901B2

(12) United States Patent
Blackman et al.

(10) Patent No.: US 11,593,901 B2
(45) Date of Patent: *Feb. 28, 2023

(54) SYSTEMS AND METHODS FOR USING BLOCKCHAINS TO RECORD, MANAGE, AND TRANSFER OWNERSHIP RIGHTS TO LAND TITLES

(71) Applicant: FIRST AMERICAN FINANCIAL CORPORATION, Santa Ana, CA (US)

(72) Inventors: David H. Blackman, Corona, CA (US); David Brown, Yorba Linda, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/112,585

(22) Filed: Dec. 4, 2020

(65) Prior Publication Data

US 2021/0090189 A1  Mar. 25, 2021

Related U.S. Application Data

(63) Continuation of application No. 15/681,227, filed on Aug. 18, 2017, now Pat. No. 10,878,522.

(Continued)

(51) Int. Cl.
*H04L 9/30* (2006.01)
*G06Q 50/16* (2012.01)
(Continued)

(52) U.S. Cl.
CPC ......... *G06Q 50/167* (2013.01); *H04L 9/0894* (2013.01); *H04L 9/14* (2013.01); *H04L 9/30* (2013.01); *G06Q 2220/10* (2013.01)

(58) Field of Classification Search
CPC .............. G06Q 50/167; G06Q 2220/10; H04L 9/0894; H04L 9/14; H04L 9/30; H04L 9/3239; H04L 9/50

See application file for complete search history.

(56) References Cited

U.S. PATENT DOCUMENTS 11,188,907 B1 * 11/2021 Vijayvergia ......... G06Q 20/023
2002/0062218 A1   5/2002 Planin
(Continued)

FOREIGN PATENT DOCUMENTS

CN          105488675        4/2016
CN          105488675 A  *   4/2016  ............. G06Q 20/36

OTHER PUBLICATIONS

"3 ways that the blockchain will change the real estate market", Don Oparah, Feb. 6, 2016 (Year: 2016).*

(Continued)

*Primary Examiner* — Jay Huang
*Assistant Examiner* — Duan Zhang
(74) *Attorney, Agent, or Firm* — Sheppard, Mullin, Richter & Hampton LLP

(57) ABSTRACT

Techniques described herein are directed to using blockchains to record, manage, and transfer ownership rights to land titles. A method in accordance with these techniques may include: creating a property blockchain that is permissioned, the property blockchain including a chronologically ordered, back-linked list of one or more blocks, the one or more blocks including a genesis block, the genesis block including property attributes including one more of the following: a physical address of the property, a year the property was built, and an owner of the property; and transmitting the property blockchain to permissioned nodes on a network, where the permissioned nodes validate transactions associated with the property that are recorded on the property blockchain.

20 Claims, 7 Drawing Sheets

Related U.S. Application Data

(60) Provisional application No. 62/376,757, filed on Aug. 18, 2016.

(51) Int. Cl.
*H04L 9/14* (2006.01)
*H04L 9/08* (2006.01)

(56) References Cited

U.S. PATENT DOCUMENTS

| | | |
|---|---|---|
| 2012/0254045 A1 | 10/2012 | Orfano |
| 2015/0170112 A1* | 6/2015 | DeCastro |
| 2015/0206106 A1* | 7/2015 | Yago ................. G06Q 20/0655 |
| | | 705/68 |
| 2015/0332395 A1* | 11/2015 | Walker ................. H04L 9/3247 |
| | | 705/69 |
| 2016/0098723 A1 | 4/2016 | Feeney |
| 2017/0085545 A1 | 3/2017 | Lohe et al. |
| 2017/0109735 A1 | 4/2017 | Sheng et al. |

OTHER PUBLICATIONS

Oparah, Don, "3 Ways That The Blockchain Will Change The Real Estate Market," Feb. 6, 2016, https://techcrunch.com/2016/02/06/03-ways-that-blockchain-will-change-the-real-estate-market/?ncid=rss, 8 pages.

* cited by examiner

SYSTEMS AND METHODS FOR USING BLOCKCHAINS TO RECORD, MANAGE, AND TRANSFER OWNERSHIP RIGHTS TO LAND TITLES

CROSS-REFERENCE TO RELATED APPLICATIONS

This present application is a continuation of and claims priority to U.S. patent application Ser. No. 15/681,227, filed Aug. 18, 2017 and issued as U.S. Pat. No. 10,878,522 on Dec. 29, 2020, which claims the benefit of U.S. Provisional Patent Application No. 62/376,757, filed Aug. 18, 2016. All of the above applications are incorporated herein by reference in their entirety.

TECHNICAL FIELD

The present disclosure relates generally to blockchain technology.

BACKGROUND

The blockchain is the ledger that underlines bitcoin and other cryptocurrencies currently on the market. In cryptocurrency systems such as Bitcoin, the blockchain acts a public ledger of all cryptocurrency transactions that have ever been executed. The blockchain is distributed and replicated across a number of nodes (generally over a peer-to-peer network). Each block contains a series of transactions, and blocks are linked to each other in chronological order with each block containing a hash of the previous block.

In cryptocurrency systems, the blockchain generally resides on a public, decentralized, and permisionless network. The system is secured through a process of mining by which new transactions are validated and recorded in a block using computational power. Miners compete for a reward to be the first to solve a proof of work (i.e., a computationally expensive mathematical problem based on a cryptographic hash algorithm) that increases in complexity as the blockchain grows. Generally speaking, in public blockchains, anyone without permission granted by another authority may read and write data to the blockchain.

More recently, interest has grown in using the distributed consensus mechanism of blockchains to manage ownership and rights arising in systems that require legal identities—permissioned nodes, to validate transactions.

BRIEF SUMMARY OF THE DISCLOSURE

Embodiments disclosed herein are directed to systems and methods for using blockchains to record, manage, and transfer ownership rights to land titles.

In one embodiment, a method includes: creating a property blockchain that is permissioned, the property blockchain including a chronologically ordered, back-linked list of one or more blocks, the one or more blocks including a genesis block, the genesis block including property attributes including one more of the following: a physical address of the property, a year the property was built, and an owner of the property; and transmitting the property blockchain to permissioned nodes on a network, where the permissioned nodes validate transactions associated with the property that are recorded on the property blockchain. In some implementations, the genesis block includes a hash pointer to a domain address of an off-chain system of one of the nodes.

In one implementation, the method further includes: placing a smart contact within the property blockchain, the smart contract including computer executable code that governs a transfer of ownership of the property from a seller to a buyer; creating a new transaction block associated with the transfer of ownership of the property from the seller to the buyer; the permissioned nodes validating the new transaction block; and adding the validated transaction block to the property blockchain. In some implementations, the seller's ownership of the property is verified prior to creating the new transaction block by applying a private key of the seller to a public key stored on a most recent block of the property blockchain.

In some implementations, in response to validation of the new transaction block: the smart contract issues a new private key to the buyer and records property transfer information on the property blockchain. The smart contract may record on the blockchain a new public key associated with the issued private key. In some instances, execution of the smart contract's code is triggered by digitally signed messages received from one of the following: the permissioned nodes, the buyer, and the seller.

In some implementations, the new transaction block includes a hash pointer to a domain address of an off-chain system of one of the plurality of nodes. The off-chain system may store and manage information related to the property, the information including at least one of: public record and document recordings, historical matters of record, traditional settlement information, and regulatory information.

In some implementations, creating the permissioned blockchain for the property includes: creating the genesis block and one or more blocks following the genesis block, where the one or more blocks following the genesis block each records a respective transaction associated with a transfer of ownership of the property that occurred before creation of the property blockchain.

In some implementations, the method further includes: transmitting a unique private key to each of the permissioned nodes; and storing public keys on the property blockchain, each of the public keys corresponding to a respective one of the transmitted unique private keys. Each of the public keys may be stored in the genesis block of the property blockchain.

In one embodiment, a method includes: creating multiple property blockchains that are permissioned, each of the property blockchains associated with a respective property and including: a chronologically ordered, back-linked list of one or more blocks, the one or more blocks including a genesis block, the genesis block including property attributes including one more of the following: a physical address of the property, a year the property was built, and an owner of the property; and transmitting each of the property blockchains to permissioned nodes on a network, where the permissioned nodes validate transactions associated with each of the properties, where the validated transactions are recorded on a respective one of the property blockchains associated with the property that is the subject of the transaction. In implementations of this embodiment, the method further includes: for each of the property blockchains, performing the operations of: transmitting a unique private key to each of the permissioned nodes; and storing public keys on the property blockchain, each of the public keys corresponding to a respective one of the transmitted unique private keys.

In implementations, creating the property blockchain for each of the property blockchains includes: creating the genesis block of the property blockchain and one or more blocks following the genesis block, where the one or more blocks following the genesis block each records a respective transaction associated with the property that occurred before creation of the property blockchain. The respective transaction may include: a transfer of the property, a mortgage on the property, a refinance of the property, a foreclosure of the property, or a transaction that fell out of escrow.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As used herein, the term "blockchain" generally refers to a distributed ledger or database that is shared and validated by multiple nodes participating on a network. A blockchain includes an ordered back-linked list of blocks of transactions identified by a unique hash that represents the unique sequence of transactions.

As used herein, the terms "on-chain" or "on-chain transaction" refer to transactions that are settled on a blockchain.

As used herein, the terms "off-chain", "side-chain", "off-chain transaction", or "side-chain transaction" refer to transactions that do not occur within the blockchain.

As used herein, the term "permissioned system" refers to a system in which an identity for permissioned users is whitelisted (or blacklisted), using, for example, a finite set of private keys. A "permissioned blockchain" or "private blockchain" generally refers to a blockchain in which only permissioned users may validate blockchain transactions. A 'permissioned validator node' may also represent a financial stake in the ecosystem.

As used herein, the term "smart contract" generally refers to event-driven computer executable code and associated data that is an expression of business logic. A smart contract may be stored and replicated on a blockchain. The smart contract, when executed, may update the blockchain, store information in the blockchain, and trigger actions off-chain.

Figure 1:
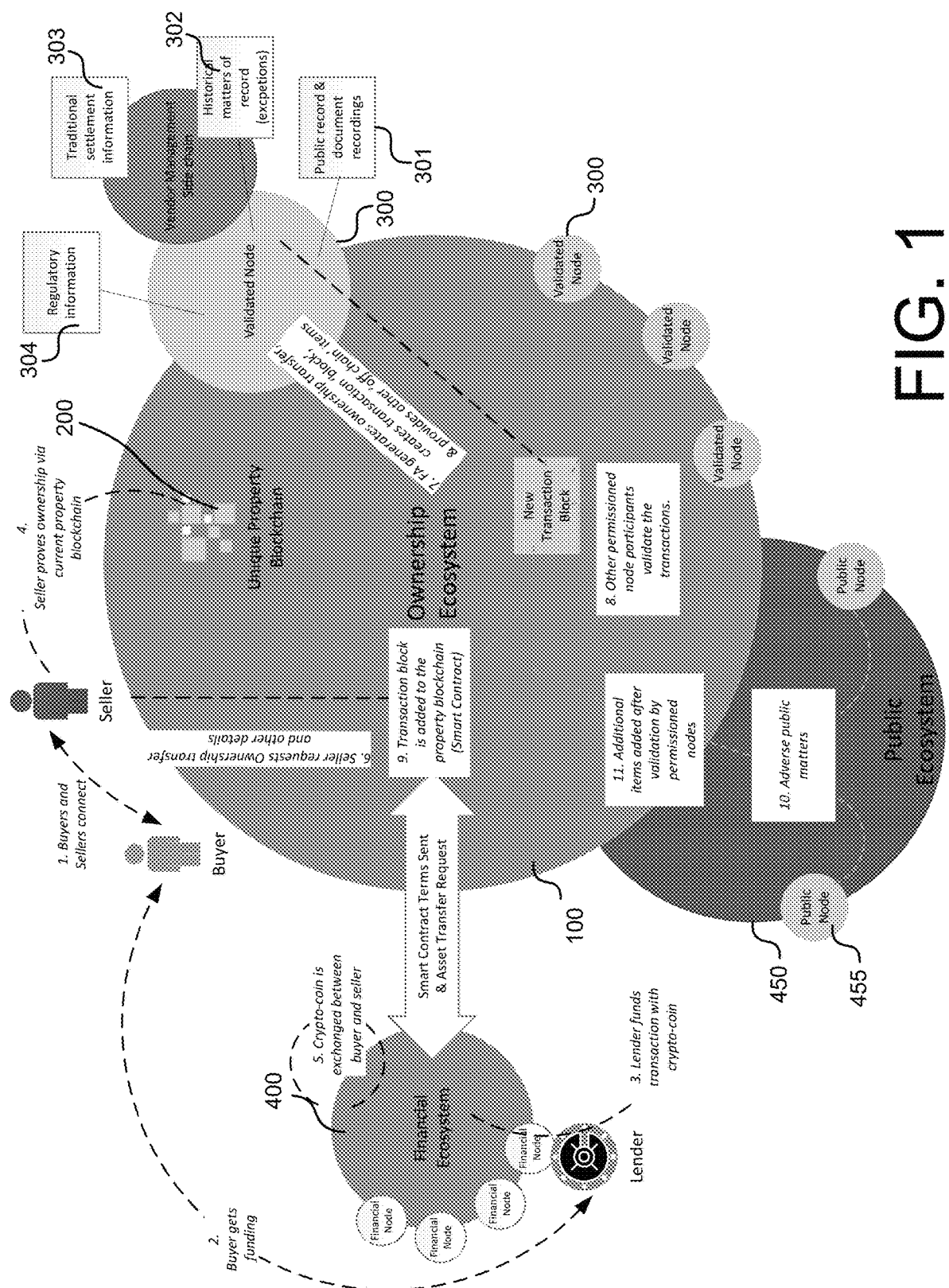
FIG. 1 illustrates an exemplary environment in which embodiments may be implemented.

Embodiments disclosed herein are directed to systems and methods for using blockchains to record, manage, and transfer ownership rights to land titles. FIG. 1 illustrates an exemplary environment in which the disclosed technology may be implemented. In this exemplary environment, land title is exchanged between a buyer (e.g. a buyer using cryptocurrency or conventional financing) and a seller. The environment comprises a land title ownership ecosystem 100, including property blockchains 200, for providing ownership information on properties, a financial ecosystem 400 for providing funding information on prospective buyers, and a public ecosystem 450.

In ownership ecosystem or network 100, ownership information on properties is provided using permissioned property blockchains 200 that are initially created, maintained and updated by permissioned validator nodes 300. Permissioned validator nodes 300, in this environment, are known and trusted entities that may create initial property blocks, generate new transaction blocks for property blockchains 200. In other words, validator nodes 300 may be a group of nodes that are given the express authority to create initial property blocks or validate blocks of transactions for property blockchains 200. Validation of each transaction is achieved by majority agreement across permissioned nodes 300. For example, validator nodes 300 may comprise trusted institutions (e.g., escrow companies, title companies, etc.) that generate property blockchain transactions that meet regulatory requirements, traditional underwriting standards, historical matters of record (e.g., title exceptions), etc.

In one embodiment, the identity of permissioned validator nodes 300 may be validated using tokens. In another embodiment, validator nodes 300 may be each given a unique private key, and a corresponding public key may be stored directly on the property blockchains 200 (e.g., the genesis block of each blockchain).

In some embodiments, limited read access to property blockchains 200 may be granted to the public or restricted to a particular class of users (e.g., licensed real estate agents and brokers, in addition to nodes 300). For example, blockchains 200 may allow the public to make a limited number of queries into the property blockchain state (e.g., inquiries into property ownership, sale history, sale prices, and like information).

Public ecosystem or network 450 of FIG. 1 illustrates one particular example in which public nodes 455 may interact with permissioned ecosystem 100. As shown in this example, public nodes 455 communicate (e.g., over a network) adverse matters of public record (i.e., matters that affect a property associated with a property blockchain 200) to permissioned nodes 300 of ownership ecosystem 100. In this scenario, permissioned nodes 300 may add transaction blocks to property blockchain 200 after validation of the information received from public nodes 455. By way of example, public nodes 455 may file a lien (e.g., a judgment lien or mechanic's lien) against a property. Permissioned nodes 300 could validate information associated with the filing of the lien and subsequently add a transaction block to property blockchain 200 providing information about the lien and/or pointers to off-chain systems containing information about the lien.

Validator nodes 300 in the environment of FIG. 1 may provide a variety of off-chain information and services related to land title/property ownership that cannot be directly stored on property blockchains 200. For example, a validator node 300 may maintain off-chain systems that store and manage information related to public record and document recordings 301, historical matters of record (e.g., title exceptions) 302, traditional settlement information 303, and regulatory information 304. In embodiments, this information may be maintained in a plurality of databases that may be accessed through a domain of validator node 300. Such information may be managed or processed using one or more application servers. By way of example, consider information related to a loan on a property. Such information may come from a variety of archived documents such as an insurance application, an escrow waiver, an adjustable rate note, an itemization of amount financed, a U.S. Department of Housing and Urban Development (HUD) Settlement statement, an adjustable rate note, a truth-in-lending statement, a loan document worksheet, a deed of trust, and a residential loan application.

Figure 2:
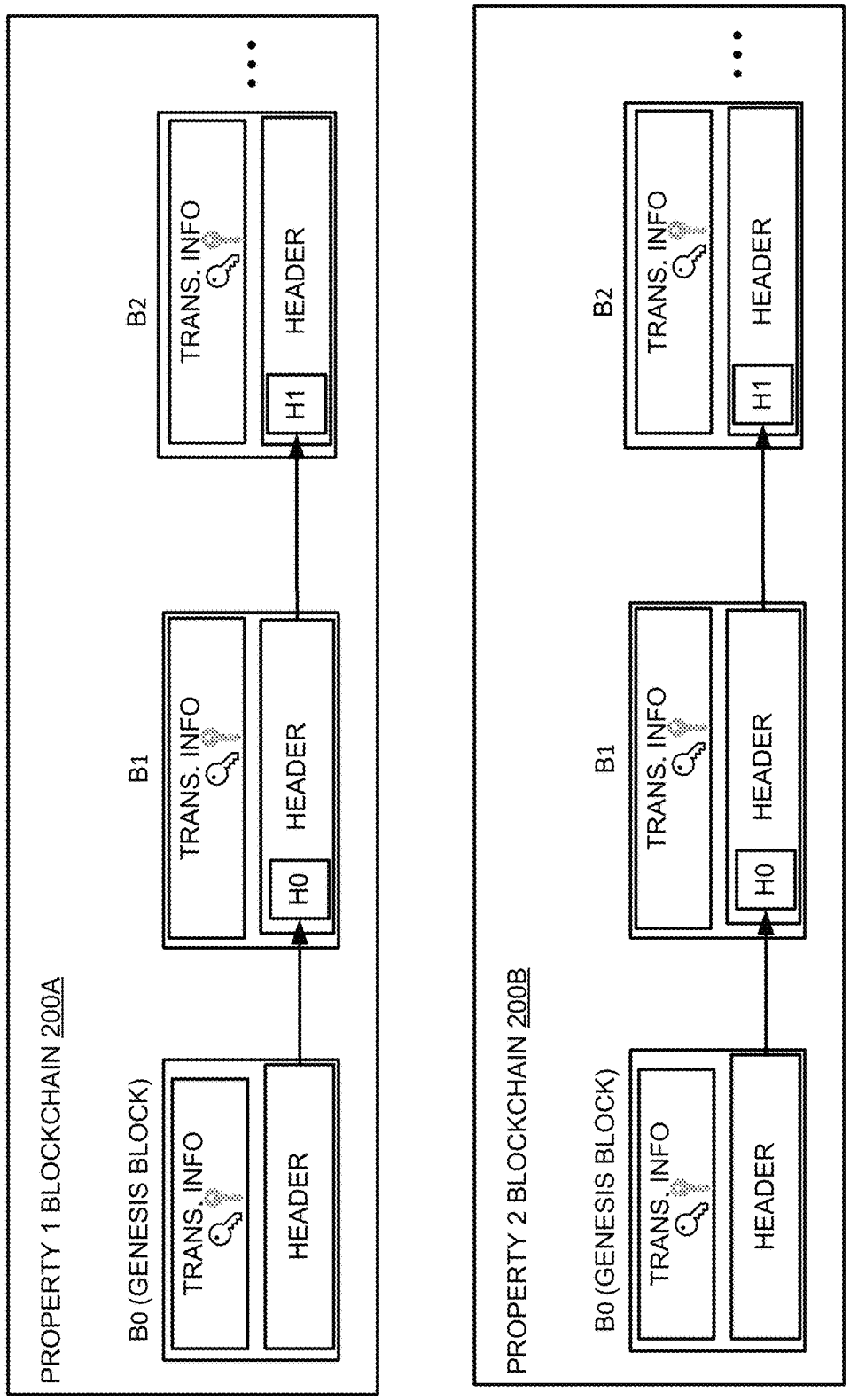
FIG. 2 illustrates an example data structure for a set of property blockchains in accordance with embodiments.

With reference now to FIG. 2, an exemplary data structure for a set of property blockchains 200A and 200B is illustrated. In this exemplary environment, a unique property blockchain 200 is created and maintained for tracking transactions related to each property in ownership ecosystem 100. Alternatively, a single blockchain may be maintained for all properties, or properties may be logically grouped into separate blockchains (e.g., based on locality or other factors). In embodiments, nodes 300 may store the full property blockchain 200 as a file or database.

In some implementations, a new block is generated for property blockchain 200 for each new transaction that occurs with respect to the property. In other implementations, a new block is generated based on a predetermined number of property transactions, a predetermined transaction type, a predetermined time between transactions, or some combination thereof. For example, a purchase transaction that fell out of escrow may not trigger a new block whereas a purchase transaction that transferred ownership may trigger the creation of a new block.

The data structure of property blockchains 200 is a chronologically ordered, back-linked list of blocks of one or more property transactions. In this embodiment, each block of the blockchain comprises a header and transaction information related to one or more transactions conducted with respect to the property. The header of each block (except for the genesis block) includes a hash of the header of the previous and current block. In embodiments, the header may comprise additional block metadata such as a timestamp (e.g., the approximate creation time of the block), a nonce, merkle trees (e.g., for transaction information, state information, etc.) and other information.

By way of example, transaction information may be recorded for title transfers of the property, mortgages on the property, refinances of the property, foreclosures of the property, and land title transactions that fell out of escrow. The transaction information may include public keys identifying the parties involved (e.g., buyer and seller). As noted above, validator nodes 300 in this exemplary environment may provide a variety of off-chain systems related to land title/property ownership that store property transaction information that cannot be directly stored on property blockchains 200. Accordingly, in various embodiments, the transaction information may include pointers or references to off-chain stored information or systems for accessing that information.

Figure 3:
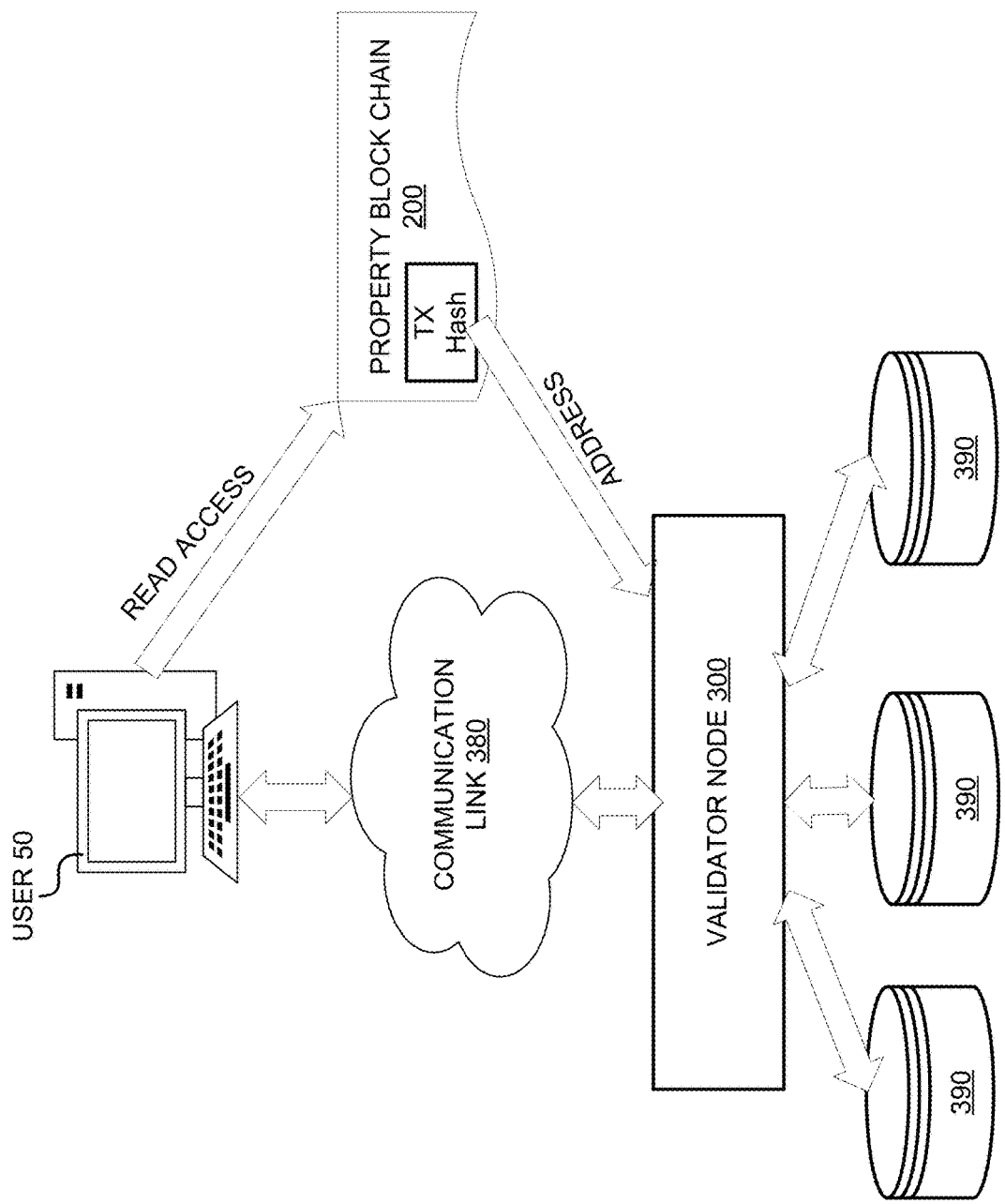
FIG. 3 is a block diagram illustrating an example communication environment in accordance with embodiments.

For example, in one implementation a property transaction may include a hash pointer to a node 300 that provides access to underwriting information, title policies, settlement statements, inspection reports, appraisal reports, and other information that is stored and generated off-chain. This hash pointer may be contained in a hash of a property transaction. FIG. 3 is a block diagram illustrating one such example communication environment where a user 50 with read access to a property blockchain 200 accesses a domain of permissioned validator node 300 over communication link 380 based on a transaction hash that references an address of validator node 300. As shown, validator node 300 includes databases 390 that store off-chain information related to the property transaction. Communication link 380 in this example environment may provide communication between user 50 and validator node 300 using any number of networks, such as: a cellular or data network, a satellite network, a cable network, a local area network (LAN), or any combination thereof.

In various embodiments, further described below, property transactions between parties may be governed by smart contracts that are stored and executed on property blockchain 200.

Figure 4:
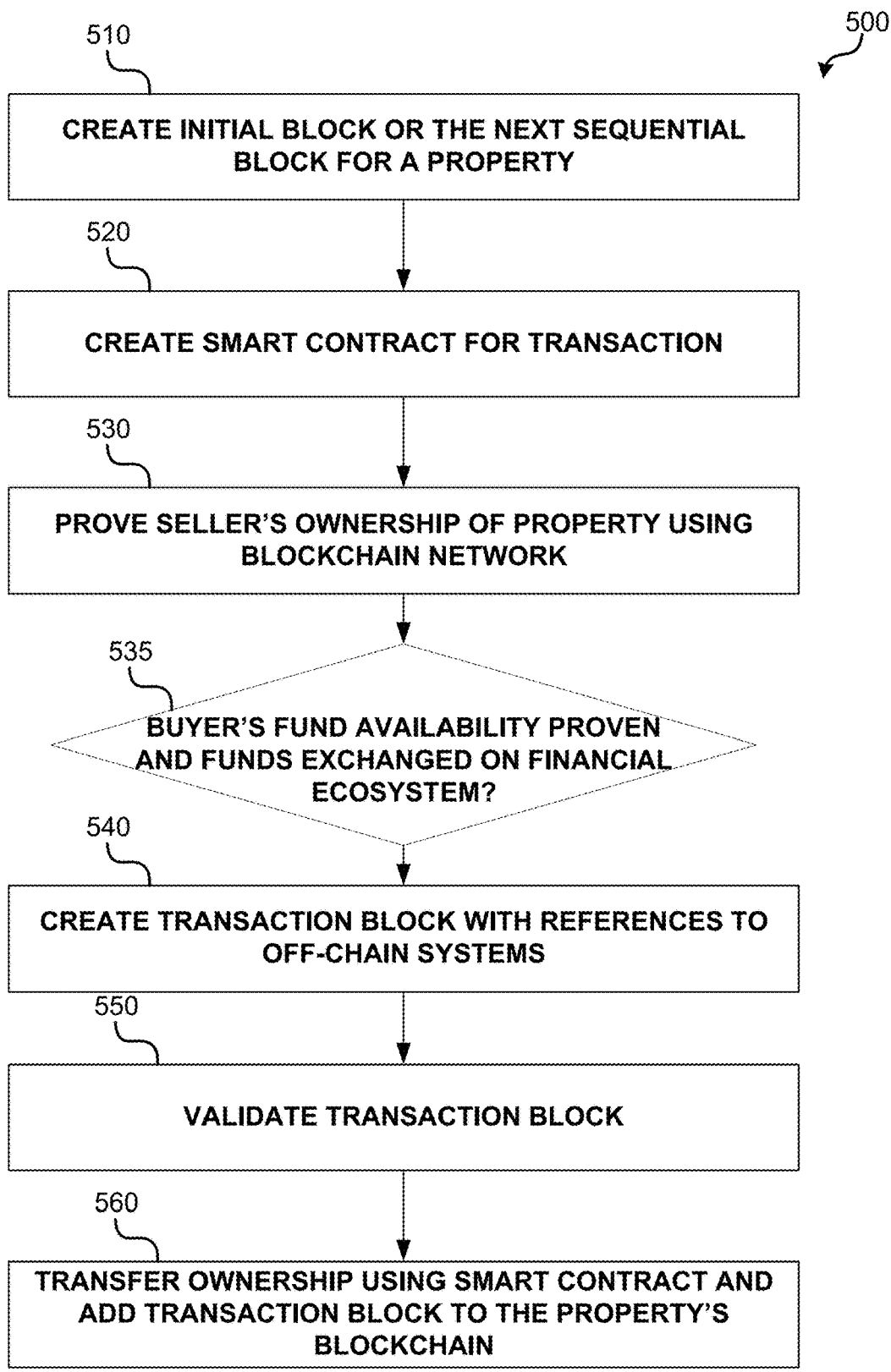
FIG. 4 is an operational flow diagram illustrating an example method that may be performed by validator nodes in the land title exchange environment of FIG. 1

FIG. 4 is a an operational flow diagram illustrating an example method 500 that may be performed by validator nodes 300 in the land title exchange environment of FIG. 1.

Prior to any buyer-seller interactions, at operation 510 an initial block or next sequential block may be created for a property and distributed to nodes 300. For example, a blockchain may be created for a newly constructed property that has no history. In this embodiment, creation of the blockchain may include creation of a genesis block including property attributes (e.g., year built, original sale price, square footage, address, etc.) and pointers to off-chain systems of nodes 300. Additionally, a unique hash value private key may be issued to the original owner of the property to establish ownership over the asset.

As another example, a blockchain may be created for a property that has a prior history. For example, consider a property that has undergone two transfers of ownership in addition to the original sale from developer to owner. In such case, a validator node 300 may use property history information stored in its system to create a property blockchain 200 that chronologically records these three transactions (e.g., as a genesis block and two follow-on blocks).

Following creation of the blockchain, a buyer and seller may connect to conduct a transfer of ownership. For example, as illustrated in the environment of FIG. 1, a buyer may connect with a lending entity through financial ecosystem 400. In this example, the lending entity preapproves the buyer with cryptocurrency.

Figure 5:
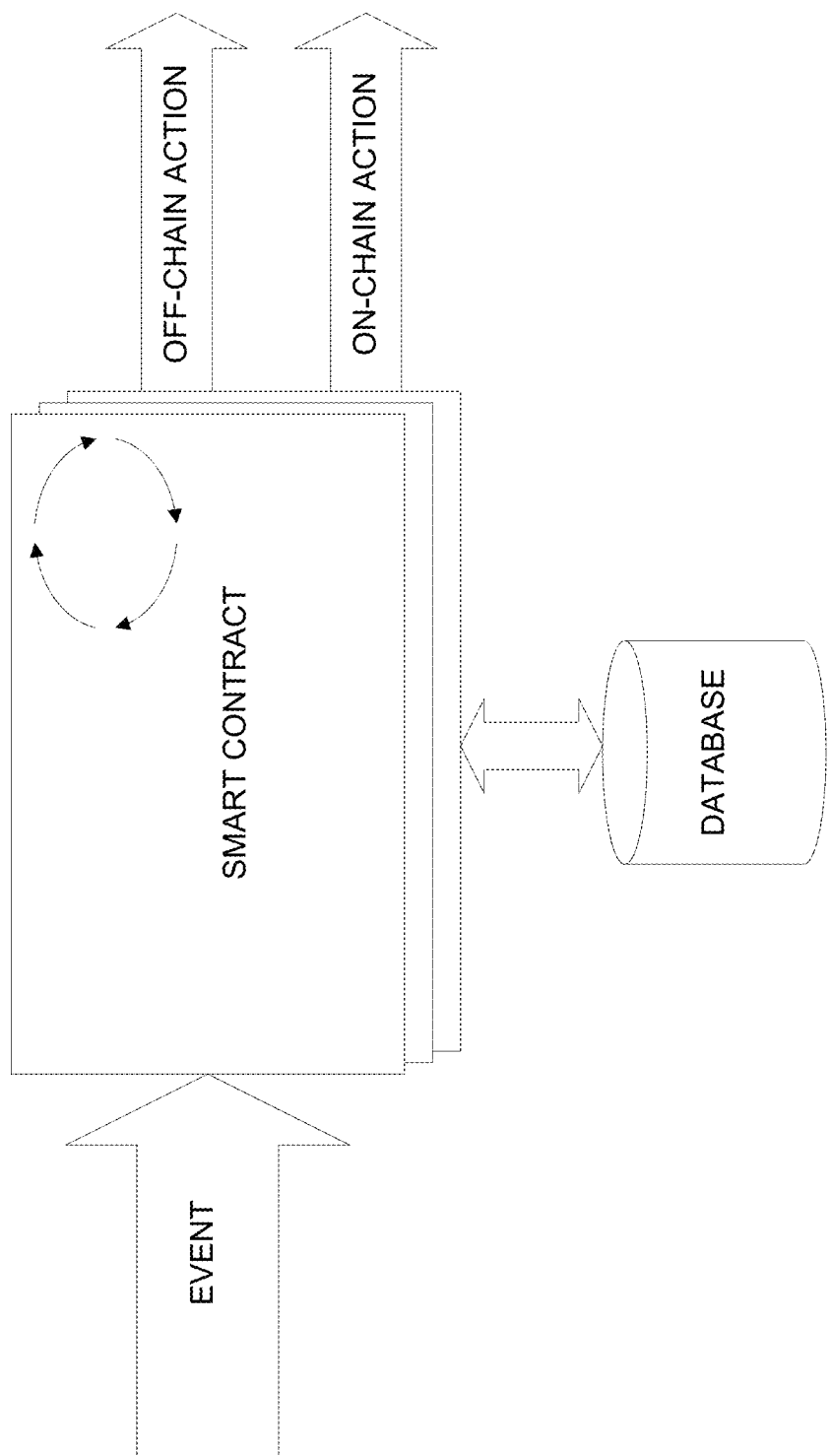
FIG. 5 is a block diagram illustrating an example operation of a smart contract.

At operation 520, following a formal offer by the buyer and acceptance by the seller, a smart contract may be created and placed on the property blockchain 200 to govern the transaction between the buyer and seller. FIG. 5 illustrates how one such smart contract 520 may operate. As shown, the smart contract 520 is a computer program with an associated database or storage. Execution of code contained in the smart contract 520 is triggered by an event, such as, for example, digitally signed messages received from permissioned users (e.g. nodes 300, the buyer, or the seller). Upon execution of code, smart contract 520 may perform on-chain actions (e.g., record a property block transaction and/or update its database) or off-chain actions (e.g., send messages to permissioned users about the status of the property transaction or trigger other smart contracts 520). In various embodiments, these steps may be performed independently on every validator node 300 within a property blockchain 200.

At operation 530, the seller's ownership of the property may be proven using the property blockchain 200. For example, in one embodiment the seller's ownership may be validated based on the history of property blockchain 200 and a unique hash private key that was issued to seller when the seller purchased the property.

At decision 535, it may be determined if the buyer has proven fund availability on the financial ecosystem 400 (e.g., loan approval) and if funds have been exchanged. For example, the buyer may have applied a private key associated with a cryptocurrency account to release funds. If so, at operation 540 a validator node 300 creates a transaction block with any off-chain or side-chain references to outside systems. The created transaction block, in various embodiments, may comprise all of the elements needed to meet regulatory requirements, traditional underwriting standards, historical matters of record (e.g., title exceptions), etc. In embodiments, a hash function of the transaction block may store the references.

At operation 550, other nodes 300 validate the transaction block. For example, validation may be achieved by majority agreement across permissioned nodes 300. At operation 560 the new transaction block is added to the property blockchain 200 and ownership is transferred to the buyer. In one embodiment, once a transaction block is validated, the smart contract may (e.g., in response to a message from a validator node 300) automate the ownership transfer and issue a new hash value private key for the buyer.

Figure 6:
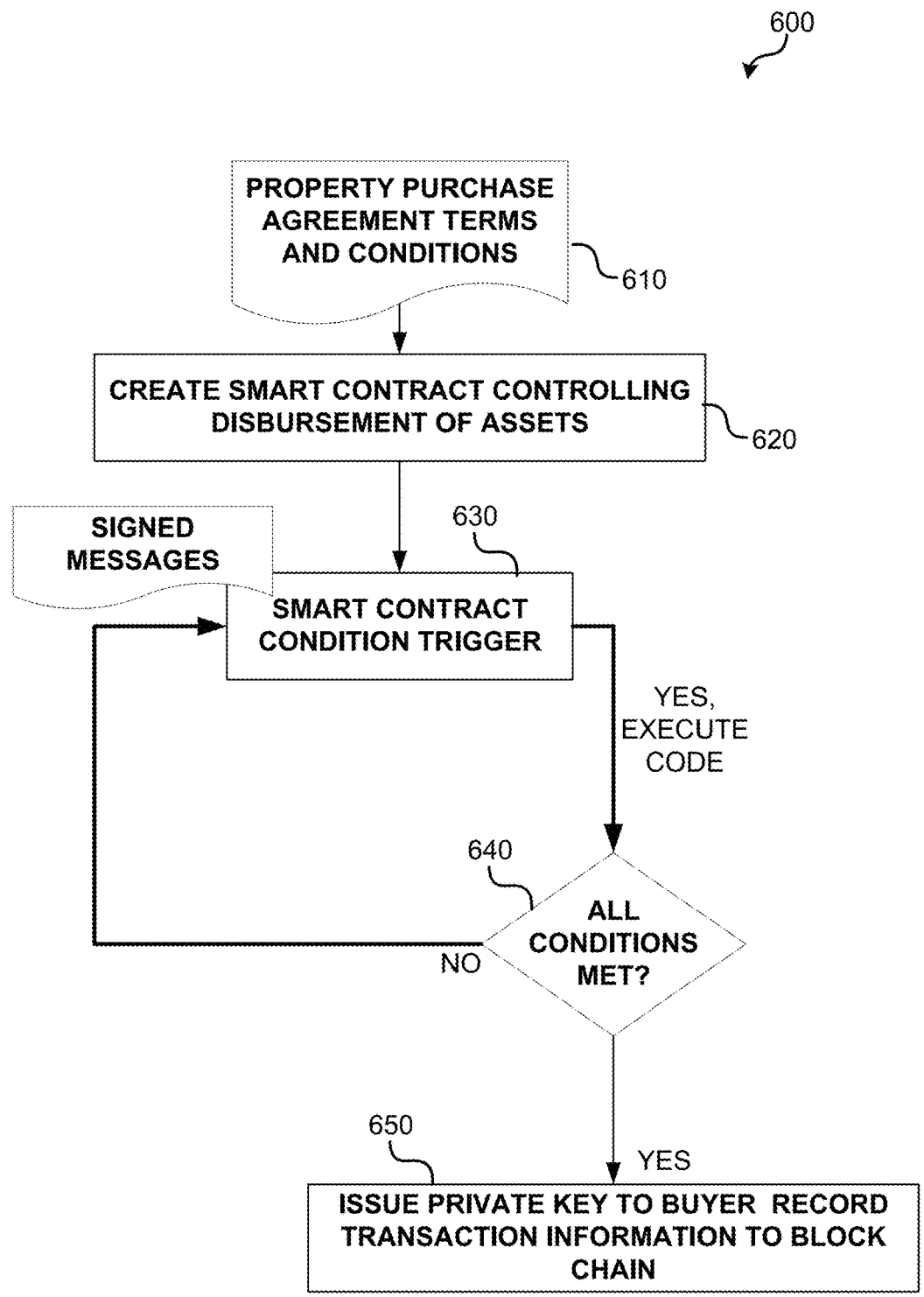
FIG. 6 is a flow diagram illustrating an example execution of a smart contract for land title exchange.

FIG. 6 is a flow diagram illustrating an example execution of a smart contract for land title exchange in accordance with an embodiment. At operation 620, a smart contract controlling disbursement of assets (i.e., seller's property and buyer's funds) is created based on a property purchase agreement 610. By way of example, consider a residential purchase property agreement by which a seller transfers a home to a buyer in exchange for a traditional currency or cryptocurrency. The purchase agreement terms and conditions may specify the purchase amount, the deposit amount, and various contingencies such as inspections, appraisals, loan approval, etc.

At operation 630, the smart contract may receive a condition trigger. For example, in the case of a residential purchase agreement, a digitally signed message received from a trusted party may indicate that an appraisal has been completed. In response to this trigger, the smart contract may execute code based on the content of the trigger. For example, the smart contract may update its database to reflect this change in state, update the blockchain ecosystem 100, send messages off-chain to nodes 300, or notify the buyer, or the seller.

After the condition trigger, the smart contract may determine at decision 640 if all conditions have been met for transfer of ownership. If not, steps 630 and 640 may iterate. Once all conditions have been met for transfer of ownership, at operation 650 the smart contract may issue a new private key to the buyer and record the property transfer information on the property blockchain 200. For example, a new public key associated with the issued private key may be recorded on the property blockchain 200 and distributed across validation nodes 300. Alternatively, this public key may be stored off-chain.

EXAMPLE USE CASES

Although embodiments disclosed herein have been primarily described with reference to using permissioned blockchains in a land title exchange environment, other example implementations are described below.

In one implementation, a permissioned blockchain network across vendors using shared blockchains may simplify and automate payment and receipts using smart contracts. In such an implementation, once terms and conditions of the smart contract are met, invoices could be paid. Disputed invoices could be flagged and routed to off-chain systems for dispute resolution.

In another implementation, smart contracts could be used in a blockchain network to monitor money laundering conditions. For example, smart contracts could monitor mortgage fraud and money laundering that could impact lenders, and when conditions are met, report money laundering conditions.

In another implementation, smart contracts could be used for financing a property. For example, smart contracts could facilitate paying off an existing loan. The smart contract could validate payoff amounts with the lender, contain payoff terms and amounts, validate incoming money, and automate payoff. Additionally, the smart contract could create a new 'encumbrance hash' for a lender that attaches to the property blockchain. As another example, a smart contract could contain terms of a new loan, and create an 'encumbrance hash' key that is added to the property blockchain. In these example scenarios, when the encumbrances are lifted, a new 'unencumbered hash' could be created and added to the blockchain.

In another implementation, smart contracts could be implemented in a real estate platform. As a first example, a series of smart contracts could be deployed to maintain records of the amount, time and conditions of investments, and source of funds. As a second example, homeowner associations could use smart contract technology to efficiently notify and vote on measures for their neighborhood. As a third example, smart contracts could also be used to aggregate inputs from various "oracles" and serve as a progress monitor for a real estate transaction.

In another implementation, blockchains could be used (e.g., by a title plant) to track illegal deeds. After establishing verified blockchains on a property, wild deeds or illegal deeds would not reach consensus across the network and be easier to identify.

In another implementation, blockchain systems could be used to capture and track issued title policies on a unique property identifier or hash.

In another implementation, blockchain systems could be used to create and track real property using a unique hash identifier. This identifier would also contain pointers to external systems with real property attributes.

In another implementation, smart contracts could be implemented for commitment to a title policy. For example, a smart contract could contain the details associated with the issuance of a title policy when conditions within a commitment (e.g., closing of escrow) are met. Once the conditions are met, the smart contract could trigger the automatic issuance of the title policy (e.g., to a home purchaser).

In another implementation, blockchain systems could be used to contain all property and name related matters from one or more public or permissioned ecosystems. Such blockchain systems could be created and managed, for example, by a title plant.

Figure 7:
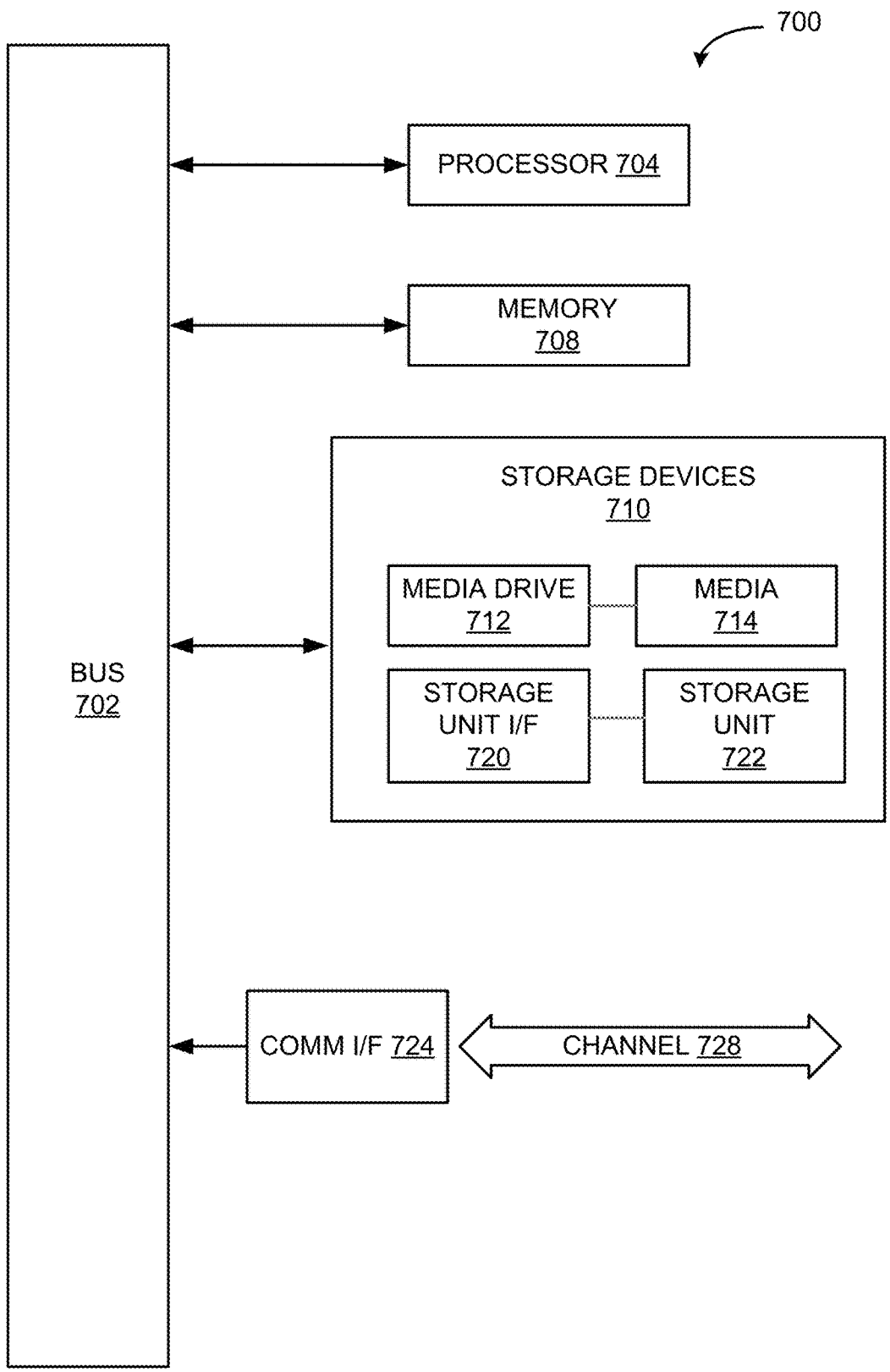
FIG. 7 illustrates an example computing module that may be used to implement various features of the methods disclosed herein.

FIG. 7 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, a solid state drive, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 708, storage unit 722, and media 714. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   validating, by one or more nodes of a blockchain network, based on a blockchain of the blockchain network and a first private key issued to a first party when the first party purchased a real property, ownership of the real property by the first party, wherein the blockchain includes a transfer history of the real property;
   triggering, by one or more digitally signed messages from the one or more nodes, execution of executable code of a smart contract deployed on the blockchain, wherein execution of the executable code comprises:
   determining that one or more conditions have been met for a transfer of ownership of the real property from the first party to a second party; and
   in response to determining that the one or more conditions have been met for the transfer of ownership:
   issuing a second private key to the second party that establishes ownership over the real property, and
   recording, on the blockchain, property transfer information related to the transfer of ownership;
   creating, by the one or more nodes, a new transaction block associated with the transfer of ownership of the real property from the first party to the second party, wherein creating the new transaction block comprises including a hash pointer to a domain address of an off-chain system of one of the one or more nodes in the new transaction block;
   validating, by the one or more nodes, the new transaction block; and
   adding, by the one or more nodes, the new transaction block to the blockchain, wherein the second private key is issued to the second party after the one or more nodes validate the new transaction block.

2. The method of claim 1, further comprising: storing, at the off-chain system of the one node, additional information related to the transfer of ownership of the real property that is not stored on the blockchain, the additional information comprising: underwriting information, a title policy, a settlement statement, an inspection report, or an appraisal report.

3. The method of claim 1, further comprising: sending a message including the property transfer information to the off-chain system using the hash pointer to the domain address of the off-chain system.

4. The method of claim 1, wherein a genesis block of the blockchain comprises the hash pointer to the domain address of the off-chain system.

5. The method of claim 1, wherein validating the first party's ownership of the real property comprises: applying the first private key to a public key stored on a block of the blockchain.

6. The method of claim 1, further comprising:
creating, by the one or more nodes, the smart contract to govern the transfer of ownership of the real property from the first party to the second party; and
deploying, by the one or more nodes, the smart contract on the blockchain.

7. The method of claim 1, wherein the execution of the executable code further comprises: in response to determining that the one or more conditions have been met for the transfer of ownership, recording on the blockchain a new public key associated with the second private key.

8. The method of claim 1, wherein the blockchain network is a permissioned blockchain network, the blockchain is a permissioned blockchain, and the one or more nodes are one or more permissioned nodes.

9. The method of claim 8, further comprising:
creating the permissioned blockchain; and
transmitting the permissioned blockchain to the one or more permissioned nodes, wherein the permissioned nodes validate transactions associated with the real property that are recorded on the permissioned blockchain.

10. The method of claim 1, wherein determining that the one or more conditions have been met for the transfer of ownership of the real property from the first party to the second party comprises: confirming that the second party has proven availability of funds specified in the one or more digitally signed messages and that the funds have been exchanged or been released.

11. One or more non-transitory computer-readable mediums storing instructions executable by one or more processors of one or more nodes of a blockchain network, wherein execution of the instructions cause the one or more processors to perform operations comprising:
validating, based on a blockchain of the blockchain network and a first private key issued to a first party when the first party purchased a real property, ownership of the real property by the first party, wherein the blockchain includes a transfer history of the real property;
triggering, by one or more digitally signed messages, execution of executable code of a smart contract deployed on the blockchain, wherein execution of the executable code comprises:
determining that one or more conditions have been met for a transfer of ownership of the real property from the first party to a second party; and
in response to determining that the one or more conditions have been met for the transfer of ownership: issuing a second private key to the second party that establishes ownership over the real property, and recording, on the blockchain, property transfer information related to the transfer of ownership;
creating a new transaction block associated with the transfer of ownership of the real property from the first party to the second party, wherein creating the new transaction block comprises including a hash pointer to a domain address of an off-chain system of one of the one or more nodes in the new transaction block;
validating the new transaction block; and
adding the new transaction block to the blockchain, wherein the second private key is issued to the second party after the new transaction block is validated.

12. The one or more non-transitory computer-readable mediums of claim 11, wherein the blockchain network is a permissioned blockchain network, the blockchain is a permissioned blockchain, and the one or more nodes are one or more permissioned nodes.

13. The one or more non-transitory computer-readable mediums of claim 12, wherein the operations further comprise: storing, at the off-chain system of the one node, additional information related to the transfer of ownership of the real property that is not stored on the blockchain, the additional information comprising: underwriting information, a title policy, a settlement statement, an inspection report, or an appraisal report.

14. The one or more non-transitory computer-readable mediums of claim 12, wherein the operations further comprise: sending a message including the property transfer information to the off-chain system using the hash pointer to the domain address of the off-chain system.

15. The one or more non-transitory computer-readable mediums of claim 12, wherein a genesis block of the blockchain comprises the hash pointer to the domain address of the off-chain system.

16. The one or more non-transitory computer-readable mediums of claim 12, wherein validating the first party's ownership of the real property comprises: applying the first private key to a public key stored on a block of the blockchain.

17. The one or more non-transitory computer-readable mediums of claim 12, wherein the operations further comprise:
creating the smart contract to govern the transfer of ownership of the real property from the first party to the second party; and
deploying the smart contract on the blockchain.

18. The one or more non-transitory computer-readable mediums of claim 12, wherein the execution of the executable code further comprises: in response to determining that the one or more conditions have been met for the transfer of ownership, recording on the blockchain a new public key associated with the second private key.

19. A system, comprising:
one or more processors of one or more nodes of a blockchain network; and
one or more non-transitory computer-readable mediums storing instructions executable by the one or more processors, wherein execution of the instructions cause the one or more processors to perform operations comprising:
validating, based on a blockchain of the blockchain network and a first private key issued to a first party when the first party purchased a real property, ownership of the real property by the first party, wherein the blockchain includes a transfer history of the real property;
triggering, by one or more digitally signed messages, execution of executable code of a smart contract deployed on the blockchain, wherein execution of the executable code comprises:
determining that one or more conditions have been met for a transfer of ownership of the real property from the first party to a second party; and
in response to determining that the one or more conditions have been met for the transfer of ownership: issuing a second private key to the second party that establishes ownership over the real property, and recording, on the blockchain, property transfer information related to the transfer of ownership;
creating a new transaction block associated with the transfer of ownership of the real property from the first party to the second party, wherein creating the new transaction block comprises including a hash pointer to a domain address of an off-chain system of one of the one or more nodes in the new transaction block;

validating the new transaction block; and adding the new transaction block to the blockchain, wherein the second private key is issued to the second party after the new transaction block is validated.

20. The system of claim 19, wherein the operations further comprise: storing, at the off-chain system of the one node, additional information related to the transfer of ownership of the real property that is not stored on the blockchain, the additional information comprising: underwriting information, a title policy, a settlement statement, an inspection report, or an appraisal report.

* * * * *